United States Patent Office 2,851,437
Patented Sept. 9, 1958

---

2,851,437

UNSATURATED POLYESTER RESIN COMPOSITION CONTAINING ESTERIFIED DIBENZOIC ACIDS AND THE PROCESS OF PREPARING THE SAME

John C. Petropoulos, Norwalk, Conn., assignor to American Cyanamid Company, New York, N. Y., a corporation of Maine No Drawing. Application July 23, 1956
Serial No. 599,332

18 Claims. (Cl. 260—45.4)

This invention relates to unsaturated polyester resin compositions and to the process of preparing the same. More particularly, this invention relates to polyester resin compositions comprising an unsaturated polyester resin and a polymerizable compound containing the polymerizable group $CH_2=C<$, wherein the polyester resin is prepared by reacting a polyhydric alcohol with an alpha, beta unsaturated polycarboxylic acid and a polycarboxylic acid having the formula

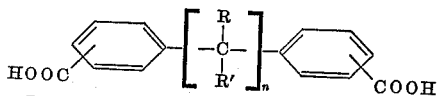

wherein R and R' are alkyl groups containing 1 to 4 carbon atoms and $n$ is a whole number between 1 and 2 inclusive.

One of the objects of the present invention is to produce polymerizable unsaturated polyester resin compositions, which may be polymerized to form hard, glossy laminates. A further object of the present invention is to produce polymerizable unsaturated polyester resin compositions such as those set forth hereinabove and in greater detail hereinbelow and to the product thus produced. These and other objects of the present invention will be discussed in greater detail hereinbelow.

The present application is a continuation-in-part of my earlier filed patent application having the Serial No. 523,355, filed July 20, 1955, entitled "Novel Products and Process for Preparing the Same." This application discloses and claims novel dibenzoic acids and process for preparing the same and their use in the preparation of alkyd resins.

In the preparation of the novel dicarboxylic acids used in the present invention, certain ditolylalkanes are oxidized to the corresponding dibenzoic acids. It is imperative, however, that the tolyl groups in the novel carboxylic acids used in the present invention be joined together through one or more non-terminal carbon atoms of the alkane. If these linking carbon atoms in the alkane chain are terminal carbon atoms, the markedly superior results realized in the practice of the process of the present invention are not experienced. First of all, the ditolylalkanes in which the tolyl groups are joined through a terminal carbon atom of the alkane are not readily oxidizable to the corresponding dicarboxylic acid and, in fact, there is often cleavage between the two tolyl groups in which oxidation takes place at the alkane group joining the tolyl groups rather than on the methyl groups on the aryl nuclei. Even though such a ditolylalkane were to be oxidized successfully to the corresponding dibenzoic acid, the unsaturated polyester resin produced therefrom would show a lack of heat stability, light stability, lack of good color, color stability, gloss and strength. Still further, such polyester resins would not be stable to mild oxidizing conditions such as air at elevated temperatures in the presence of metallic salt driers. The exact opposite is true of the polyester resins prepared from the novel dibenzoic acids of the present invention. These new polyester resins show improved heat stability, improved light stability, improved color, improved color stability, improved gloss, improved strength and said polyester resins are stable to mild oxidizing conditions such as those mentioned above.

The ditolylalkanes used in the present invention may be oxidized under any of the usual oxidizing conditions to form the corresponding dibenzoic acids. In the oxidation of the ditolyl alkanes, one may utilize temperatures varying from about room temperature to about the boiling point of the ditolyl alkane. It is preferred, however, to utilize temperatures greater than about 100° C. as the temperatures significantly below that temperature will cause the oxidation reaction to proceed slowly. The oxidation reaction may be carried out in the presence of any of the well known oxidizing reagents such as chromic acid in glacial acetic acid; potassium permanganate, in the presence of an alkali; potassium dichromate, in the presence of a strong acid such as sulfuric acid, or the oxidation may simply be carried out by flowing air, oxygen or a gas containing oxygen through the charge. The oxidation could further be carried out in the presence of heavy metal catalysts such as the metallic salts of organic acids such as the cobalt, lead, iron, nickel, manganese, magnesium and the like salts of acetic acid, propionic acid, oleic acid, stearic acid, rosen acids, naphthenic acid and the like. The oxidation can be carried either at atmopsheric pressure or super-atmospheric pressures such as about 3 or 4 atmospheres. The oxidation may be carried out either in the liquid phase or in the vapor phase. In the vapor phase, the ditolyl alkane would be vaporized and in being boiled off would be passed over a fixed bed of catalysts of the vanadium type. In the vapor phase, there is a possibility of closer control of the contact time, temperature, and the separation of the oxidized material from the unoxidized in a recycling operation. In such an oxidation reaction, it is generally desirable to stop the conversion at about 30–40% of the calculated yield in order to avoid side reactions and other complications. The oxidation reaction being stopped at just such a point would permit the separation of the dicarboxylic acids thus produced and the recyclization of the ditolyl alkanes. The lower limit on the reaction temperature of the oxidation reaction is generally considered to be above the melting point of the particular ditolyl alkane selected for oxidation. Still lower temperatures can be utilized if the oxidation is carried out with the ditolyl alkane dispersed or dissolved in a solvent medium. The utilization of the solvent medium, however, may well effect the upper limit at which the oxidation can be carried out, inasmuch as the boiling point of the solvent will be one of the controlling factors in the oxidation temperature. Of course, if super-atmosphere pressure is utilized, the boiling point of the solvent is not a necessary limitation on the temperature of the oxidation reaction. The solvent medium should properly be a material which cannot readily be oxidized under the oxidation conditions of the reaction. Otherwise, complications of mixed end products will be presented. In addition to the oxidation in a solvent medium, dispersions and emulsions may be utilized as the medium for oxidation.

Some of the ditolyl alkanes which are oxidized to the dibenzoic acids of the present invention may be prepared by reacting a compound having the general formula:

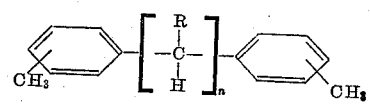

wherein R is hydrogen or an alkyl group containing between 1 and 4 carbon atoms, and wherein $n$ is a whole number between 1 and 2, inclusive, with an olefin having between 2 and 4 carbon atoms such as ethylene, propylene and butylene either alpha, beta or isobutylene. Instead of using an olefin containing between 2 and 4 carbon atoms, one could react the compound with an alkyl halide having between 1 and 4 carbon atoms, such as methyl iodide or the like to yield a methyl substituent in place of the hydrogen on the alkane. The total number of mols of methyl iodide or olefin used in the reaction will depend on the total number of available hydrogens on the alkane that are to be replaced.

The following is set forth for the purpose of illustrating the method of the preparation of a ditolyl alkane. This example is set forth primarily for the purpose of illustration and all parts are parts by weight.

PREPARATION OF 2,2-DI(P-TOLYL)BUTANE

Into an autoclave there is introduced 105 parts of 1,1-di(p-tolyl)ethane, 5 parts of sodium and 1.5 parts of o-toluic acid. The system is purged with nitrogen gas and then sealed. The autoclave is then heated to about 170° C. and the pressure is released. There is then charged 11.8 parts of ethylene to 900 p. s. i. and the system is closed. The temperature is then maintained at 170° C. with intermittent addition of ethylene until no further pressure drop is experienced. This requires about 6 hours. The autoclave is then cooled and the reaction products are filtered and washed with hexane. The filtrates are combined, washed and distilled. The product produced is 2,2-di(p-tolyl)butane having a boiling point of 196° C. at 20 millimeters of pressure.

PREPARATION OF 3,3-DI(P-TOLYL)PENTANE

The preceding example is repeated in all essential details except that in the place of 1,1-di(p-tolyl)ethane, there is substituted an equivalent amount of 1,1-di(p-tolyl)propane and in the place of the o-toluic acid, there is substituted an equivalent amount of o-chloro-toluene. The resultant product is a viscous liquid having a boiling point of 213-220° C. at 15 mm. of mercury. The product is 3,3-di(p-tolyl)pentane.

Among the ditolyl alkanes which may be prepared by a comparable process or by the alkyl halide process and which may be used in the practice of the process of the present invention are 2,2-di(p-tolyl)propane; 2,2-di(o-tolyl)propane; 2,2 - di(m-tolyl)propane; 1,2-di(p-tolyl)-1,1,2,2 - tetramethylethane; 1,2-di(p-tolyl) - 1,1,2,2-tetraethylethane; 1,2-di(p-tolyl)-1,1,2,2-tetrapropylethane; 1,2-di(p-tolyl) - 1,1,2,2 - tetrabutylethane; 1,2-diethyl-1,2-di(p-tolyl) - 1,1,2,2 - tetramethyl-1,2-di(p-tolyl)ethane; 1,1,2,2-tetraethyl-1,2-di(o-tolyl)ethane; 1,1,2,2-tetrabutyl-1,2-di(o-tolyl)-ethane; 2,2-di(p-tolyl)butane; 2,2-di(o-tolyl)butane; 2,2-di(m-tolyl)-butane; 2,2 - di(p-tolyl)pentane; 2,2 - di(o-tolyl)pentane; 2,2-di(m-tolyl)pentane; 3,3-di(p-tolyl)pentane; 3,3-di(o-tolyl)pentane; 3,3 - di(m-tolyl)pentane; 2,2 - di(p-tolyl)-hexane; 3,3-di(o-tolyl)hexane; 3,3-di(p-tolyl)heptane; 3,3-di(o-tolyl) heptane; 4,4-di(p-tolyl)heptane; 4,4-di(p-tolyl)octane; 5,5 - di(p-tolyl)nonane; 5,5 - di(o-tolyl)nonane, 5,5-di(m-tolyl)nonane, and the like.

EXAMPLE 1

PREPARATION OF 4,4'-(2,2-BUTYLIDENE)DIBENZOIC ACID

Into a suitable reaction vessel equipped with thermometer, stirrer and reflux condenser, there is introduced 10 parts of 2,2-di(p-tolyl)butane, 300 parts of acetic acid, 300 parts of water, 90 parts of concentrated sulfuric acid and 70 parts of chromic acid. The mixture is heated to reflux temperature and maintained at that temperature for about 10 hours. On diluting the reaction mixture with water, 7 parts of a solid material precipitated. After purification by recrystallization from alcohol, this solid material melted at 267° C. uncorrected, and had a neutral equivalent of 150 (theoretical=149). The product produced is identified as 4,4'-(2,2-butylidene) dibenzoic acid.

ALTERNATIVE METHOD FOR PREPARATION OF 4,4'-(2,2-BUTYLIDENE)DIBENZOIC ACID

Into an autoclave equipped as in Example 1, there is introduced 23.8 parts of 2,2-di-p-tolylbutane, 30.6 parts of concentrated nitric acid, and 61.0 parts of wtaer. The reactants are heated to 160° C., whereupon the reaction becomes exothermic and the temperature increases to about 190° C. The reactants are held at 170-190° C. for 30 minutes. Thereafter, the charge is cooled to room temperature and the reactants are discharged. The product produced, a light tan solid, is obtained in an 84% yield and melts at about 220-225° C. After several recrystallizations from acetic acid to remove the color impurities, the melting point is raised to 267-8° C. uncorrected. The analysis: Calculated for $C_{18}H_{18}O_4$: C, 72.47; H, 6.08; neutral equivalent 149. Found: C, 72.23; H, 6.14; neutral equivalent 150.

PREPARATION OF 4,4' - (3,3 - PENTYLIDENE)DIBENZOIC ACID

Into an autoclave equipped as in Example 1, there is introduced 25.2 parts of 3,3-di-p-tolyl-pentane, 30.6 parts of concentrated nitric acid and 61 parts of water. The reactants are heated to 160° C., whereupon the reaction becomes exothermic and the temperature rises to about 185-190° C. The reactants are held at 175-190° C. for about 30 minutes, whereupon the charge is cooled to room temperature and the reactants discharged. The yield is approximately 87% of theoretical and the product produced is a light tan solid which melts at about 255-285° C. After several recrystallizations from acetic acid, the melting point is determined at 305-6° C., uncorrected. The product produced is 4,4'-(3,3-pentylidene)dibenzoic acid. Analysis calculated for $C_{19}H_{20}O_4$: C, 73.06; H, 6.34; neutral equivalent 156. Found: C, 73.11; H, 6.65, neutral equivalent 153.

PREPARATION OF 4,4' - (1,1,2,2 - TETRAMETHYLETHYLENE)DIBENZOIC ACID

Into a suitable reaction vessel equipped as in Example 1, there is introduced 20 parts of 1,1,2,2-tetramethyl-1,2-di-(p-tolyl) ethane, 600 parts of acetic acid, 600 parts of water, 140 parts of chromic acid and 180 parts of sulfuric acid. The charged mixture is heated at the reflux temperature for about 22 hours. Dilution of the system with water caused 20 parts of a solid material to precipitate which had a neutral equivalent of 113. The crude solid which precipitated was treated with alkali yielding two fractions; the first fraction (A) was soluble in cold alkali, whereas the second fraction (B) was soluble in hot alkali. The latter fraction (B), on acidification, gave a solid acid which, after purification by crystallization from acetic acid, melted at 218-19° C. uncorrected. The analysis and infrared spectrum on this material are compatible with the monobasic acid having the following formula: 1,1,2,2 - tetramethyl - 1 - (p-tolyl)-2-(p-carboxyphenyl)-ethane. Analysis calculated for $C_{20}H_{24}O_2$; C, 81.04; H, 8.16; —COOH, 15.19. Found: C, 81.30; H, 8.23; —COOH, 14.88. The acidification of fraction (A) gave a white solid of a melting point of greater than 300° C. This material was found to be insoluble in most of the common solvents. In order to facilitate purification, this material was converted into the more soluble dimethyl ester derivative by treatment with excess methanol and dry hydrogen chloride. Concentration of the methanol solution gave colorless prisms, which after crystallization from methanol melted at 218° C. uncorrected. The analysis and infrared spectrum of this material are compatible with the compound dimethyl 4,4'-(1,1,2,2-tetramethylethylene)dibenzoate. Calculated for $C_{22}H_{26}O_4$; C, 74.55; H, 7.40; saponification number 177. Found: C, 74.47; H, 7.59; saponification number 172. The hydrolysis of the dimethyl ester is accomplished by refluxing the same in methanolic potassium hydroxide followed by acidification with hydrochloric acid to give a solid having a melting point greater than 300° C. Analysis and infrared spectroscopy demonstrated this material to be the di-acid derivative of the above-identified dimethyl ester and was found to be 4,4'-(1,1,2,2-tetramethylethylene)dibenzoic acid.

PREPARATION OF 4,4'-(1,1,2,2-TETRAETHYLETHYLENE)DIBENZOIC ACID

Sample 1 is repeated in substantially all details except that the ditolyl alkane used as a starting material is 1,1,2,2-tetraethyl-1,2-di(p-tolyl)ethane and the dicarboxylic acid produced is 4,4'-(1,1,2,2-tetraethylethylene)dibenzoic acid.

PREPARATION OF 4,4'-(1,2-DIETHYL-1,2-DIMETHYLETHYLENE)DIBENZOIC ACID

Example 1 is repeated in substantially all essential details except that the ditolyl alkane which is oxidized is 1,2-diethyl-1,2-dimethyl-1,2-di(p-tolyl)ethane. The acid produced is 4,4' - (1,2 - diethyl-1,2-dimethylethylene)-dibenzoic acid.

PREPARATION OF 4,4'-ISOPROPYLIDENEDIBENZOIC ACID

Example 1 is repeated in all essential details except that the ditolyl alkane which is oxidized is 2,2-di(p-tolyl)propane and the corresponding acid is produced, namely, 4,4'-isopropylidene-dibenzoic acid.

Among the dicarboxylic acids which may be used in accordance with the concepts of the present invention are: 4,4'-isopropylidene-dibenzoic acid; 4,4'-(2,2-butylidene)dibenzoic acid; 4,4' - (1,1,2,2 - tetramethylethylene)dibenzoic acid; 4,4'-(1,1,2,2-tetraethylethylene) dibenzoic acid; 4,4'-(1,1,2,2-tetrapropylethylene)dibenzoic acid; 4,4'-(1,1,2,2-tetrabutylethylene)dibenzoic acid; 3,3'-isopropylidene-dibenzoic acid; 2,2'-isopropylidenedibenzoic acid; 4,4'-(1,2 - diethyl - 1,2 - dimethylethylene)dibenzoic acid; 2,2' - (1,1,2,2 - tetraethylethylene)dibenzoic acid; 2,2'-(1,1,2,2-tetrabutylethylene)dibenzoic acid; 4,4'-(2,2-butylidene)dibenzoic acid; 3,3'-(2,2-butylidene)dibenzoic acid; 2,2' - (2,2 - butylidene)dibenzoic acid; 4,4'-(2,2-pentylidene)dibenzoic acid; 3,3'-(2,2-pentylidene)dibenzoic acid; 2,2'-(2,2-pentylidene)dibenzoic acid; 4,4'-(3,3-pentylidene)dibenzoic acid; 3,3'-(3,3-pentylidene)dibenzoic acid; 2,2'-(3,3-pentylidene)dibenzoic acid; 4,4'-(2,2-hexylidene)dibenzoic acid; 3,3'-(2,2-hexylidene)dibenzoic acid; 2,2'-(2,2-hexylidene)dibenzoic acid; 4,4'-(3,3-hexylidene)dibenzoic acid; 4,4'-(3,3-heptylidene)dibenzoic acid; 3,3'-(3,3-heptylidene)dibenzoic acid; 4,4'-(4,4-heptylidene)dibenzoic acid; 4,4'-(4,4-octylidene)dibenzoic acid; 3,3'-(4,4-octylidene)dibenzoic acid; 2,2'-(4,4-octylidene)dibenzoic acid; 4,4'-(5,5-nonylidene)dibenzoic acid; 3,3'-(5,5-nonylidene)dibenzoic acid; 2,2'-(5,5-nonylidene)dibenzoic acid and the like.

In the preparation of the polyester resins of the present invention, one may react any of the novel dicarboxylic acids such as those set forth hereinabove and an alpha, beta ethylenically unsaturated polycarboxylic acid with any of the conventional polyhydric alcohols used in the preparation of polyester resins. The polyhydric alcohols which may be used in the preparation of the polymerizable unsaturated polyester resins of the present invention are preferably those alcohols containing only two hydroxyl groups; however, those alcohols containing three hydroxy groups, four hydroxy groups or even more hydroxy groups may be used but preferably in minor amounts compared to the total amount of polyhydric alcohol used. Illustrative examples of the various dihydroxy alcohols that find embodiment in my invention are: ethylene glycol, diethylene glycol, propylene glycol, dipropylene glycol, butandiol-1,4, butandiol-1,3, butandiol-1,2, pentadiol-1,4, pentadiol-1,5, hexandiol-1,6, and the like. Additionally, such polyhydric alcohols as glycerol, pentaerythritol, dipentaerythritol, pinacol, arabitol, xylitol, adonitol, mannitol and the like may be used. Quite obviously, these polyhydric alcohols may be used either singly or in combination with one another.

In preparing the unsaturated polyester resins of the present invention, the alpha, beta ethylenically unsaturated polycarboxylic acids should be present in amount approximating at least about 20% by weight of the total weight of polycarboxylic acids used and preferably in amounts varying between about 25% and 65% by weight based on the total weight of polycarboxylic acid present. Among the alpha, beta ethylenically unsaturated polycarboxylic acids which may be used to prepare the unsaturated polyester resins of the present invention are maleic, fumaric, aconitic, itaconic and the like. Quite obviously, these unsaturated polycarboxylic acids may be used either singly or in combination with one another.

If it is desired to make use of other saturated polycarboxylic acids, i. e., those which are free of non-benzenoid unsaturation, one could use such acids as phthalic, malonic, succinic, glutaric, sebacic, adipic, pimelic, suberic, azelaic, tricarballylic, citric, tartaric, malic and the like, but in amounts less than about 75% of the total amount of polycarboxylic acid free of non-benzenoid unsaturation present. Whenever available, the anhydrides of these acids may be used or mixtures of the acids and/or their anhydrides may be used in the preparation of the polyester resins.

In the preparation of the polymerizable unsaturated polyesters of the present invention, one may use the polyhydric alcohols and the mixture of polycarboxylic acids in a proportion substantially equal, i. e., about mole for mole, and preferably an excess of alcohol approximating 15% above the stoichiometrical quantity required for complete esterification. If polyhydric alcohols containing more than two hydroxy groups are used, calculation of the molar proportion should be made on a stoichiometric basis so as to make allowance for the additional hydroxy groups such as those found in glycerol, pentaerythritol and the like. This is also true when polycarboxylic acids having more than two carboxyl groups are employed. A sufficient quantity of alcohol and acid should be reacted so as to produce an ultimate polyester resinous material having an acid number not significantly greater than about 55 and not significantly lower than about 20 and preferably having an acid number from about 35 to 40.

The polymerizable unsaturated polyester resins are admixed with a monomer compound containing the polymerizable $CH_2=C<$ group to give a composition that may be cured to a stable thermoset condition. One may use about 10 parts by weight of the monomeric material to about 90 parts by weight of the unsaturated polyester resin up to about 60 parts of the monometric material to about 40 parts of the polymerizable unsaturated polyester resin. The preferred embodiment, however, is to use from about 25 parts of the monomeric material to about 35 parts of the monomeric material with about 75 parts to about 65 parts, respectively, of the polymerizable unsaturated polyester resin.

The monomeric material containing the polymerizable $CH_2=C<$ group which may be used in the practice of the present invention, has a boiling point of at least 60° C. Among the polymerizable monomeric materials that will find use in my invention are such as styrene, sidechain alkyl and halo substituted styrenes such as alpha, methylstyrene, alpha chlorostyrene, alpha ethylstyrene and the like or alkyl and halo ring-substituted styrenes such as ortho, meta and paraalkyl styrenes such as o-methylstyrene, p-ethylstyrene, meta-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, allyl gluconate, allyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloro endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like. These monomeric materials may be used either singly or in combination with one another.

In the preparation of the unsaturated polyester resins of the present invention, it is unnecessary to use a catalytic material as the acids and the dihydric alcohols will readily react at elevated temperatures to produce the polyester resin. When the unsaturated polyester resin is combined with the polymerizable monomeric material, however, it is desirable to incorporate therein a polymerization inhibitor in order to prevent premature gelation of the resinous composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, benzaldehyde, ascorbic acid, isoascorbic acid, resorcinol, tannin, symmetrical di-(beta-naphthyl)-p-phenylene diamine, phenolic resins, sulfur compounds and the like. The concentration of the inhibitor is preferably and as a general rule less than 1% by weight is usually sufficient. However, with the preferred inhibitors, e. g., polyhydric phenols and aromatic amines, one may make use of such small amounts as 0.01%–0.1% by weight.

The unsaturated polyester resins of the present invention will find application in a great plurality of fields such as in the preparation of laminates and other reinforced plastics, coating compositions, adhesive compositions, molding compositions, potting and the like. These polyester resins can readily be solidified without benefit of catalyst by the application of heat or by the application of heat and pressure. However, in such an operation without benefit of a catalytic agent the time element makes it desirable to incorporate into the composition conventional polymerization catalysts such as the organic superoxides, the alcoholic and acidic peroxides. Among the preferred catalysts are: the acidic peroxides, e. g., bonzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcohol peroxides, e. g., tertiary-butyl hydroperoxide, usually called tertiary-butyl peroxide and terpene oxides, e. g., ascaridole. Still other polymerization catalysts might be used in some instances, e. g., soluble cobalt salts (particularly the linoleate and naphthenate), p-toluene sulfonic acid, aluminum chloride, stannic chloride and boron trifluoride.

The compositions of the present invention may be used alone or in admixture with a filler or a dye, pigment, opacifier, lubricant and the like. Among the fillers which may be employed are alpha cellulose pulp, asbestos fibers, cotton flock, chopped cloth cuttings, glass fibers, wood flour, mica dust, sand, clay, diatomaceous earth and the like.

Natural or other synthetic resins and other modifiers may be incorporated into the unsaturated polyester resinous compositions of this invention in order to modify the latter and to obtain products which may be especially suited for a particular service application. Examples of such modifying agents are shellac, ester gums, cellulose esters and ethers, urea-aldehyde resins, aminotriazine-aldehyde resins (e. g. melamine-formaldehyde resins), phenol-aldehyde resins, hydrocarbon-substitute polysiloxane resins, e. g., methyl polysiloxane resins, methyl phenyl polysiloxane resins, phenyl polysiloxane resins, conventional alkyd resins of the nonpolymerizable type, etc. The polymers and copolymers of this invention also may be modified by incorporating therewith rubber or synthetic rubber-like products.

If it is desired, one may use a promoter in combination with the catalytic agent in order to accelerate the cure of the polymerizable polyester resin composition to a thermoset state. Amongst the promoters which may be utilized are those disclosed in the U. S. Patents 2,466,800 and 2,480,928. Particularly advantageous are the mercaptans such as n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-hexadecyl mercaptan, secondary hexyl mercaptan, tertiary hexyl mercaptan, tertiary octyl mercaptan, and the like. The dialkyl substituted anilines are additionally useful as promoters, particularly the dimethyl aniline, diethyl aniline, dipropyl aniline, dibutyl aniline and the like. Obviously, these promoters can be used either singly or in combination with one another.

In order that the present invention may be more completely understood, the following examples are set forth in which all parts are parts by weight unless otherwise indicated. These examples are set forth primarily for the purpose of illustration and any specific enumeration of detail set forth therein should not be interpreted as a limitation on the case except as is indicated in the appended claims.

Example 2

Into a suitable reaction vessel equipped with stirrer, thermometer, inert gas inlet tube and a steel jacketed condenser, there is introduced 156 parts of propylene glycol, 96 parts of maleic anhydride, 278 parts of 4,4'-(2,2-butylidene)dibenzoic acid and 0.06 part hydroquinone. The charged materials are heated gradually to about 190–200° C. while bubbling carbon dioxide through the reaction mass to aid in the removal of water. The temperature of the charge is maintained at 190–200° C. until an acid number of 41 is reached. A sample of the product is then poured into trays to cool. The polyester resin thus prepared is a hard glass-like mass when cooled. Another sample of the product is cut 60 parts polyester with 40 parts of monomeric styrene to give an ultimate resinous composition having a viscosity of $Z_4$-$Z_5$ on the Gardner-Holdt scale at 25° C. A further sample is cut 55 parts of polyester, 45 parts monomeric styrene to give a resinous composition having viscosity of $Z_1$-$Z_2$ on the Gardner-Holdt scale. A further sample of the polyester resin is cut 50/50 with monomeric styrene to give a resinous composition having viscosity of W on the Gardner-Holdt scale. A still further sample of the resin was cut 40 parts polyester resin with 60 parts of monomeric styrene to produce a resinous composition having a viscosity of I on the Gardner-Holdt scale. The sample which was cut with 40 parts of monomeric styrene is catalyzed with 1 part of benzoyl peroxide and poured between two glass plates that are sealed together on three edges by a suitable gasket material. The resinous composition was cured by heating at 125° F. for 10 hours, thereafter raising the temperature to 250° F. over a three-hour period and holding at 250° F. for two to three hours. The cast material is removed from between the glass plates and subjected to a plurality of tests. A cast was prepared from a commercially available unsaturated polyester resin composition substantially identical in all respects to that prepared hereinabove except that the polyester resin was prepared from phthalic anhydride instead of the 4,4'-2,2-(butylidene)dibenzoic acid. This second casting was subjected to the same tests as the first casting and the comparative results are shown in Table I.

TABLE I

| Properties | Resin of Example 2 | Commercially Available Polyester Resin |
|---|---|---|
| Percent Unsaturation | 19.6 | 17.1 |
| Percent Styrene | 40 | 40 |
| Barcol Hardness | 42 | 45 |
| Heat Distortion, °C | 109 | 64 |
| Flex. Strength at 25° C | 10,700 | 10,600 |
| Flex. Strength at 25° C. after 1 day— | | |
| in H₂O at 100° C | 10,000 | 7,300 |
| in 10% NaOH at 100° C | 8,800 | 1,500 |
| in 10% H₂SO₄ at 100° C | 11,000 | 8,700 |
| Flex. Strength at 25° C. after 4 days— | | |
| in H₂O at 100° C | 6,300 | 2,400 |
| in 10% NaOH at 100° C | 4,600 | Disintegrated |
| in 10% H₂SO₄ at 100° C | 10,100 | 6,200 |

Example 3

Into a suitable reaction vessel equipped as in Example 2 there is introduced 142.6 parts of propylene glycol, 357.6 parts of 4,4'-(2,2-butylidene)dibenzoic acid, 58.8 parts of maleic anhydride and 0.06 part of hydroquinone. The charged materials are heated gradually to about 190–200° C. while bubbling carbon dioxide through the reaction mass and the temperature is held at 190–200° C. until an acid number of 40.4 is reached. The product is then poured into trays to cool. The polyester resin thus prepared is a hard, glass-like mass when cooled. A sample of the polyester resin thus prepared when cut 60 parts polyester with 40 parts of monomeric styrene had a viscosity of X–Y on the Gardner-Holdt scale at 25° C.

Example 4

Into a suitable reaction vessel equipped as in Example 2 there is introduced 127.2 parts of diethylene glycol, 208.6 parts of 4,4'-(2,2-butylidene)dibenzoic acid, 39.2 parts of maleic anhydride, 14.6 parts of adipic acid and 0.4 part of hydroquinone. The charged materials are heated gradually to about 190° C.–200° C. as in Example 1 and held at about that temperature until an acid number of 19.2 is reached. A sample of the resin thus prepared is cut, 60 parts of polyester resin with 40 parts of monomeric styrene to give a resinous composition having a viscosity of $Z_1+$ Gardner-Holdt. A casting is prepared from this resinous composition in substantially the same manner as was done in Example 2. A further polyester resin composition was prepared by reacting diethylene glycol, phthalic anhydride, maleic anhydride, adipic acid and hydroquinone with the components charged in such a way as to give substantially identical percentage of unsaturation compared with the polyester resin composition prepared immediately hereinabove. The acid number of the phthalic anhydride polyester resin was 40. This phthalic anhydride polyester resin was cut, 60 parts polyester with 40 parts styrene and a casting was prepared therefrom substantially in identically the same manner as outlined hereinabove. A further resinous composition is prepared by reacting diethylene glycol, isophthalic acid, maleic anhydride, adipic acid and hydroquinone with the proportions of the materials present in an amount calculated to give the same percentage of unsaturation as that prepared immediately hereinabove. The acid number of the isophthalic acid polyester resin was 20. The isophthalic acid polyester resin composition was cut, 60 parts of polyester resin with 40 parts of monomeric styrene. A casting is prepared therefrom in substantially the same identical manner as set forth hereinabove. The three castings, namely, the casting prepared from the 4,4'-(2,2-butylidene)dibenzoic acid, the one from the phthalic anhydride and the one from isophthalic acid are subjected to a plurality of tests and the test results compared. The results of these tests are set forth in Table II hereinbelow.

TABLE II

| Properties | Resin Using Phthalic Anhydride | Resin Using Isophthalic Acid | Resin Using 4,4'-(2,2-Butylidene) Dibenzoic Acid |
|---|---|---|---|
| Percent Unsaturation | 11.0 | 11.0 | 11.0 |
| Barcol | 7–10 | 18 | 22–28 |
| Tensile | 3,300 | 6,400 | 9,700 |
| Flex. Strength at 25° | 5,200 | 9,000 | 11,700 |
| Flex. Strength at 60° | Too soft | 165 | 10,500 |
| Flex. Modulus at 25° | 0.15 | 0.23 | 0.42 |
| Flex Modulus at 60° | Too soft | <0.1 | 0.29 |
| Heat Distortion, °C | <25 | 42 | 65 |

Example 5

Into a suitable reaction vessel equipped as in Example 2, there is introduced 156 parts of propylene glycol, 98 parts of maleic anhydride, 312 parts of 4,4'-(3,3-pentylidene)dibenzoic acid and 0.05 part hydroquinone. The charged materials are heated gradually to about 190–200° C. and held at that temperature until an acid number of 30 is reached. The polyester resin thus produced is cut, 55 parts of polyester resin to 45 parts of monomeric styrene to give a resinous composition having a viscosity of $Z_3$–$Z_4$ on the Gardner-Holdt scale at 25° C. Castings produced therefrom in the manner outlined hereinabove give comparable properties to the castings produced from the 4,4'-(2,2-butylidene)dibenzoic acid.

Example 6

Into a suitable reaction vessel equipped as in Example 2, there is introduced 78 parts of propylene glycol, 49 parts of maleic anhydride, 142 parts of 4,4'-(isopropylidene)dibenzoic acid and 0.025 part of hydroquinone. The charged materials are heated gradually to a temperature of about 190–200° C. and held at about that temperature until an acid number of 25 is reached. The polyester resin thus prepared is cut, 60 parts polyester resin with 40 parts of monomeric styrene to give a resinous composition having a viscosity of $Z_4$–$Z_5$ Gardner-Holdt. Castings produced therefrom were favorably comparable to the castings produced from the butylidene dibenzoic acid polyester resins as set forth hereinabove.

Example 7

Into a suitable reaction vessel equipped as in Example 2, there is introduced 127.2 parts of diethylene glycol, 248 parts of the dimethyl ester of 4,4'-(1,1,2,2-tetramethylethylene)dibenzoic acid, 57.5 parts of dimethyl maleate, 174 parts of dimethyl adipate, 0.05 part of hydroquinone and 0.23 part of lead acetate. The charged materials are heated gradually to about 190° C. and methanol is collected until 95% of the theoretical methanol evolved is recovered. The resulting polyester resin is cut 50/50 with monomeric styrene. A casting produced therefrom, in the manner set forth hereinabove, had properties favorably comparable to the castings prepared from the butylidene dibenzoic acid polyester resins as described herein above.

Example 8

The polyester resin of Example 2 is repeated except that instead of being cut 60/40 with monomeric styrene, it is cut 60/40 with an isomeric mixture of ortho, meta and para methyl styrene. Castings produced therefrom are comparable to the castings produced with monomeric styrene.

Example 9

The polyester resin of Example 4 is repeated except that in the place of monomeric styrene, there is used an equal amount of diallyl phthalate. A casting produced therefrom had comparable properties to the one prepared with monomeric styrene.

If it is desired to produce fire-resistant or fire-retardant polyester resin composition articles, particularly laminates, one could utilize the halogenated dibenzoic acids as is suggested in my parent application. The dibenzoic acids used in the present invention may be nuclearly halogenated with chlorine, bromine, iodine and/or fluorine but preferably with chlorine.

If it is desired to produce thermoset materials using the unsaturated polyester resins of the present invention which will be resistant to the harmful effects of ultraviolet light, one could make use of any of the well-known ultraviolet light absorbers such as the 2-hydroxy, 4-alkoxybenzophenone, e. g., 2-hydroxy, 4-methoxybenzophenone, 2-hydroxy, 4-ethoxybenzophenone and the like or the 2,2'-dihydroxy-4,4'-dimethoxybenzophenone and the like. These substituted benzophenones are used in conventionally small amounts.

In addition to those compounds containing the $CH_2=C<$ group as set forth hereinabove, one can readily make use of other vinylidene compounds and vinyl compounds such as the alkyl esters of acrylic acid, e. g., ethyl acrylate, butyl acrylate, methyl methacrylate, butyl methacrylate, ethyl alpha chloroacrylate and the like, or the nitriles such as acrylonitrile, methacrylonitrile, alpha chloronitrile and the like or vinylidene cyanide, vinyl butylether, vinyl esters such as vinyl acetate, vinyl propionate and the like. Quite obviously, these polymerizable compounds may be used either singly or in combination with one another.

I claim:

1. A process for preparing an unsaturated polyester resin composition comprising reacting an unsaturated polyester resin with a polymerizable compound containing a polymerizable $CH_2=C<$ group, wherein said polyester resin is the reaction product of a polyhydric alcohol, an alpha, beta ethylenically unsaturated polycarboxylic acid and an acid having the formula:

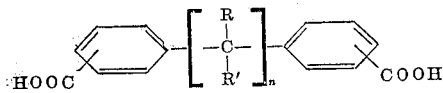

wherein R and R' are alkyl groups containing 1 to 4 carbon atoms and n is a whole number between 1 and 2 inclusive.

2. A process for preparing an unsaturated polyester resin composition comprising reacting an unsaturated polyester resin with styrene, wherein said polyester resin is the reaction product of a polyhydric alcohol, an alpha, beta ethylenically unsaturated polycarboxylic acid and an acid having the formula:

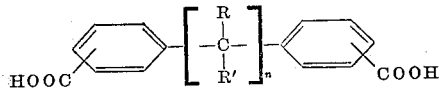

wherein R and R' are alkyl groups containing 1 to 4 carbon atoms and n is a whole number between 1 and 2 inclusive.

3. A process for preparing an unsaturated polyester resin composition comprising reacting an unsaturated polyester resin with diallyl phthalate, wherein said polyester resin is the reaction product of a polyhydric alcohol, an alpha, beta ethylenically unsaturated polycarboxylic acid and an acid having the formula:

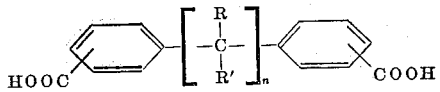

wherein R and R' are alkyl groups containing 1 to 4 carbon atoms and n is a whole number between 1 and 2 inclusive.

4. A process for preparing an unsaturated polyester resin composition comprising reacting an unsaturated polyester resin with triallyl cyanurate, wherein said polyester resin is the reaction product of a polyhydric alcohol, an alpha, beta ethylenically unsaturated polycarboxylic acid and an acid having the formula:

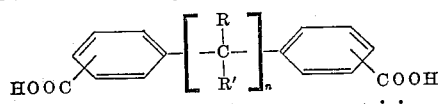

wherein R and R' are alkyl groups containing 1 to 4 carbon atoms and n is a whole number between 1 and 2 inclusive.

5. A process for preparing an unsaturated polyester resin composition comprising reacting an unsaturated polyester resin with a polymerizable compound containing a polymerizable $CH_2=C<$ group wherein said polyester resin is the reaction product of a polyhydric alcohol, an alpha, beta ethylenically unsaturated polycarboxylic acid and 4,4'-isopropylidenedibenzoic acid.

6. A process for preparing an unsaturated polyester resin composition comprising reacting an unsaturated polyester resin with a polymerizable compound containing a polymerizable $CH_2=C<$ group wherein said polyester resin is the reaction product of a polyhydric alcohol, an alpha, beta ethylenically unsaturated polycarboxylic acid and 4,4'-(2,2-butylidene)dibenzoic acid.

7. A process for preparing an unsaturated polyester resin composition comprising reacting an unsaturated polyester resin with a polymerizable compound containing a polymerizable $CH_2=C<$ group wherein said polyester resin is the reaction product of a polyhydric alcohol, an alpha, beta ethylenically unsaturated polycarboxylic acid and 4,4'-(3,3-pentylidene)dibenzoic acid.

8. A process for preparing an unsaturated polyester resin composition comprising reacting an unsaturated polyester resin with a polymerizable compound containing a polymerizable $CH_2=C<$ group wherein said polyester resin is the reaction product of a polyhydric alcohol, an alpha, beta ethylenically unsaturated polycarboxylic acid and 4,4'-(1,1,2,2-tetramethylethylene)dibenzoic acid.

9. A process for preparing an unsaturated polyester resin composition comprising reacting an unsaturated polyester resin with styrene, wherein said polyester resin is the reaction product of a polyhydric alcohol, an alpha, beta ethylenically unsaturated polycarboxylic acid and 4,4'-(2,2-butylidene)dibenzoic acid.

10. A composition of matter comprising a polymerizable mixture of an unsaturated polyester resin and a polymerizable compound containing a polymerizable $$CH_2=C<$$

group wherein said polyester resin is the reaction product of a polyhydric alcohol, an alpha, beta ethylenically unsaturated polycarboxylic acid and an acid having the formula:

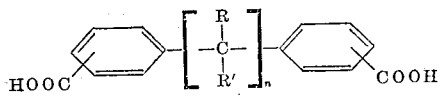

wherein R and R' are alkyl groups containing 1 to 4 carbon atoms and n is a whole number between 1 and 2 inclusive.

11. A composition of matter comprising a polymerizable mixture of an unsaturated polyester resin and styrene wherein said polyester resin is the reaction product of a polyhydric alcohol, an alpha, beta ethylenically unsaturated polycarboxylic acid and an acid having the formula:

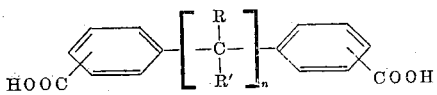

wherein R and R' are alkyl groups containing 1 to 4 carbon atoms and n is a whole number between 1 and 2 inclusive.

12. A composition of matter comprising a polymerizable mixture of an unsaturated polyester resin and diallyl phthalate wherein said polyester resin is the reaction product of a polyhydric alcohol, an alpha, beta ethylenically unsaturated polycarboxylic acid and an acid having the formula:

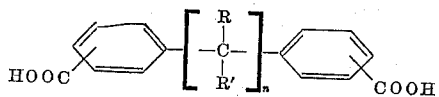

wherein R and R' are alkyl groups containing 1 to 4 carbon atoms and $n$ is a whole number between 1 and 2 inclusive.

13. A composition of matter comprising a polymerizable mixture of an unsaturated polyester resin and triallylcyanurate wherein said polyester resin is the reaction product of a polyhydric alcohol, an alpha, beta ethylenically unsaturated polycarboxylic acid and an acid having the formula:

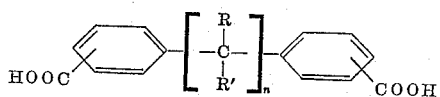

wherein R and R' are alkyl groups containing 1 to 4 carbon atoms and $n$ is a whole number between 1 and 2 inclusive.

14. A composition of matter comprising a polymerizable mixture of an unsaturated polyester resin and a polymerizable compound containing a polymerizable

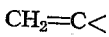

group wherein said polyester resin is the reaction product of a polyhydric alcohol, an alpha, beta ethylenically unsaturated polycarboxylic acid and 4,4'-isopropylidenedibenzoic acid.

15. A composition of matter comprising a polymerizable mixture of an unsaturated polyester resin and a polymerizable compound containing a polymerizable

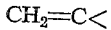

group wherein said polyester resin is the reaction product of a polyhydric alcohol, an alpha, beta ethylenically unsaturated polycarboxylic acid and 4,4'-(2,2-butylidene)dibenzoic acid.

16. A composition of matter comprising a polymerizable mixture of an unsaturated polyester resin and a polymerizable compound containing a polymerizable $CH_2=C<$ group wherein said polyester resin is the reaction product of a polyhydric alcohol, an alpha, beta ethylenically unsaturated polycarboxylic acid and 4,4'-(3,3-pentylidene)dibenzoic acid.

17. A composition of matter comprising a polymerizable mixture of an unsaturated polyester resin and a polymerizable compound containing a polymerizable $CH_2=C<$ group wherein said polyester resin is the reaction product of a polyhydric alcohol, an alpha, beta, ethylenically unsaturated polycarboxylic acid and 4,4'-(1,1,2,2-tetramethylethylene)dibenzoic acid.

18. A composition of matter comprising a polymerizable mixture of an unsaturated polyester resin and styrene wherein said polyester resin is the reaction product of a polyhydric alcohol, an alpha, beta ethylenically unsaturated polycarboxylic acid and 4,4'-(2,2-butylidene)dibenzoic acid.

References Cited in the file of this patent

UNITED STATES PATENTS

| 2,255,313 | Ellis | Sept. 9, 1941 |
| 2,677,703 | Toland | May 4, 1954 |

FOREIGN PATENTS

| 510,659 | Canada | Sept. 14, 1949 |

UNITED STATES PATENT OFFICE
CERTIFICATE OF CORRECTION

Patent No. 2,851,437 September 9, 1958

John C. Petropoulos

It is hereby certified that error appears in the printed specification of the above numbered patent requiring correction and that the said Letters Patent should read as corrected below.

Column 2, line 26, for "rosen" read -- rosin --; column 4, line 8, for "wtaer" read -- water --; column 6, line 55, for "monometric" read -- monomeric --; column 7, line 54, for "bonzoyl" read -- benzoyl --; column 8, line 4, for "hydrocarbon-substitute" read -- hydrocarbon-substituted --.

Signed and sealed this 25th day of November 1958.

(SEAL)
Attest:

KARL H. AXLINE
Attesting Officer

ROBERT C. WATSON
Commissioner of Patents